US010929388B1

(12) United States Patent
Howes et al.

(10) Patent No.: US 10,929,388 B1
(45) Date of Patent: Feb. 23, 2021

(54) DISTRIBUTED MULTI-VERSION PARTITIONED MAPREDUCE FOR A DATA FABRIC

(71) Applicant: Workday, Inc., Pleasanton, CA (US)

(72) Inventors: Jason Howes, Somerville, MA (US); Noah Arliss, Lexington, MA (US)

(73) Assignee: Workday, Inc., Pleasanton, CA (US)

( * ) Notice: Subject to any disclaimer, the term of this patent is extended or adjusted under 35 U.S.C. 154(b) by 245 days.

(21) Appl. No.: 16/048,046

(22) Filed: Jul. 27, 2018

(51) Int. Cl.
*G06F 16/23* (2019.01)
*G06F 16/2455* (2019.01)
*H04L 29/08* (2006.01)

(52) U.S. Cl.
CPC .... *G06F 16/2379* (2019.01); *G06F 16/24554* (2019.01); *H04L 67/10* (2013.01)

(58) Field of Classification Search
CPC .............. G06F 16/254; G06F 16/2365; G06F 16/2272; G06F 16/2329; G06F 9/5061
USPC ........................................................ 707/703
See application file for complete search history.

(56) References Cited

U.S. PATENT DOCUMENTS

| | | | |
|---|---|---|---|
| 9,563,697 B1 * | 2/2017 | Caplan | G06F 16/24554 |
| 2004/0088513 A1 * | 5/2004 | Biessener | G06F 21/85 |
| | | | 711/173 |

* cited by examiner

*Primary Examiner* — Hunt T Vy
(74) *Attorney, Agent, or Firm* — Van Pelt, Yi & James LLP

(57) ABSTRACT

A system for performing a computation includes an interface and a processor. The interface is configured to receive an indication of the computation. The processor is configured to determine whether the computation is with respect to a computation version number. In response to a determination that the computation is with respect to a computation version number: 1) determine whether the system has been updated to at least the computation version number; and 2) in response to a determination that the system has been updated to at least the computation version number: a) determine a set of data values for the computation associated with the computation version number; b) perform a partition reduce operation on the set of data values to determine a partition result; and c) provide the partition result.

21 Claims, 13 Drawing Sheets

US 10,929,388 B1

DISTRIBUTED MULTI-VERSION PARTITIONED MAPREDUCE FOR A DATA FABRIC

BACKGROUND OF THE INVENTION

Cluster computing systems comprising a plurality of computing systems operating in parallel often use a MapReduce programming paradigm for processing large data sets. The MapReduce paradigm, or more generally map reduce as referred to herein, comprises a map step that is executed in parallel on subsets of a data set (e.g., equal subsets of the data), followed by a reduce step that combines the results of the map step into a single output. The reduce step is executed by the master node of the cluster system. The map step can take full advantage of the parallelism of the cluster, however, the reduce step is executed by the single master node. This creates a limitation where the master node acts as a bottleneck to future cluster computing operations. In addition, the map reduce paradigm can suffer from inefficiencies for multiple sequences of calculations especially when portions of calculations are repeated at different times.

BRIEF DESCRIPTION OF THE DRAWINGS

Various embodiments of the invention are disclosed in the following detailed description and the accompanying drawings.

DETAILED DESCRIPTION

Figure 1:
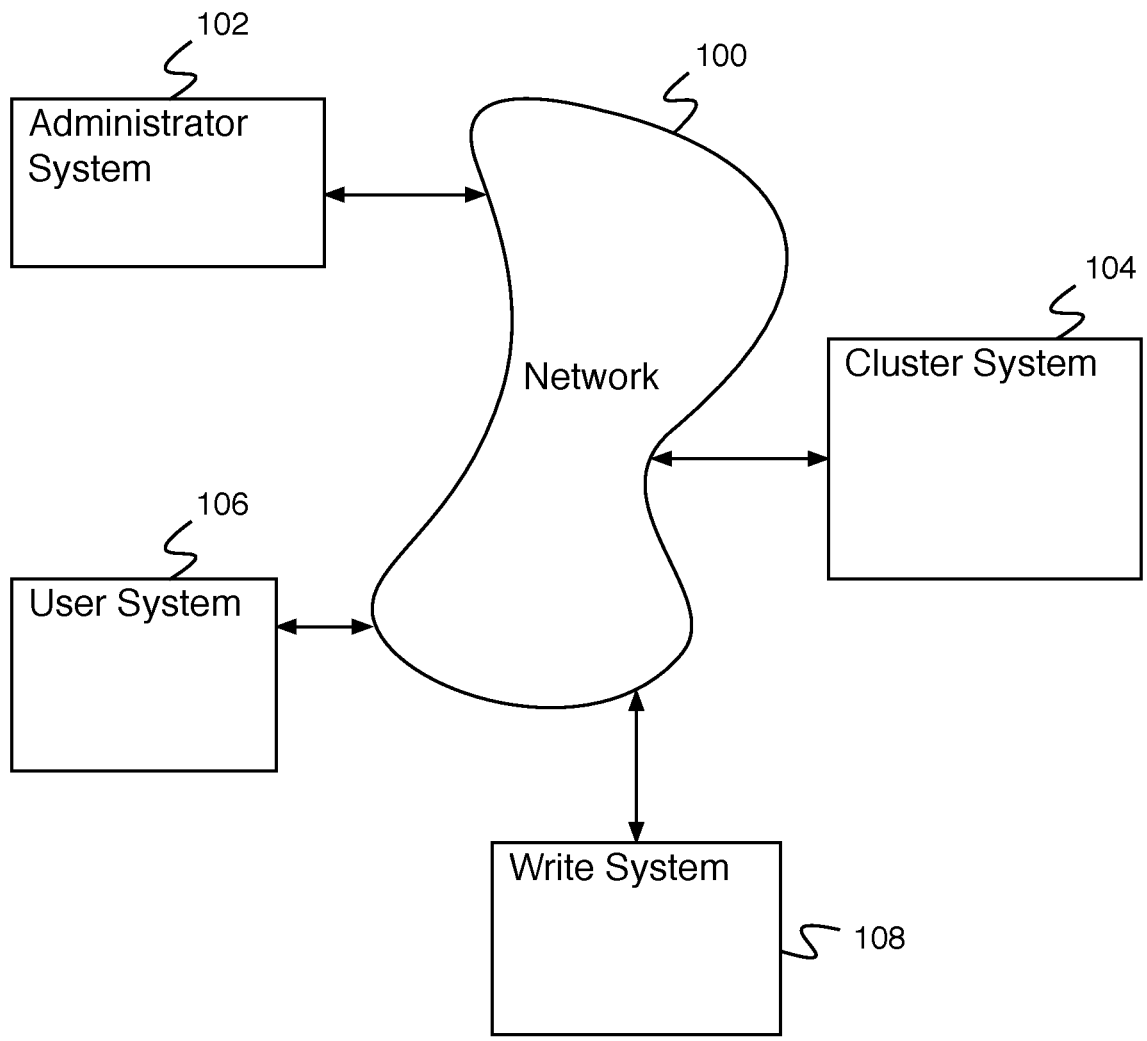
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for performing a computation comprises an interface to receive an indication of the computation, and a processor configured to determine whether the computation is with respect to a computation version number. The processor is additionally configured to, in response to a determination that the computation is with respect to a computation version number, determine whether the system has been updated to at least the computation version number, and in response to a determination that the system has been updated to at least the computation version number, determine a set of data values for the computation associated with the computation version number, perform a partition reduce operation on the set of data values to determine a partition result, and provide the partition result.

A system for a distributed multi-version partitioned map reduce is disclosed. The system comprises a plurality of nodes, a plurality of partitions, and one or more services (hosted by one or more service nodes). The partitions are divided (e.g., equally or non-equally) between the nodes of the system. The service nodes expose a well-defined interface to the system with which they can receive and process requests from a requestor. Services are computational libraries that provide a well-defined interface to the system through which the services can receive requests. Nodes contain services and the same service can be deployed to multiple nodes allowing for scalability. The requestor selects a service node to manage execution of a task and sends the request to that node by using a local representation of the interface exposed by the service running on the service node. When selecting a service node, the system can be configured to use the same node for every request or a different node for every request (e.g., to evenly distribute the load). If a service is deployed to multiple nodes, the selection of a service node is picked at random to start, and subsequent requests are routed either to the same node for every request or a different node for every request, or routed in any other manner. The service nodes are configured to receive a task, provide a request for partition results to the plurality of partitions, receive partition results from the plurality of partitions, execute a service node reduce to determine a service node result, and provide the service node result.

A write system for writing data to the system for a distributed multi-version partitioned map reduce comprises a system for writing data including a version number. For example, each time a write transaction is executed, a version number is associated with the write transaction; the version number comprises an incremented version of a previous version number. Partitions storing data updated by the write transaction store new versions of the data according to the transaction, associated with the version number. Data is stored using a library of keys, each key associated with a set of values, each value associated with a version number. When the data is updated the new value is stored associated with the key, wherein the new value is associated with the transaction version number. Additionally, when data is updated, all partitions of the system (e.g., partitions storing updated data and partitions not storing updated data) update a current version number storage.

Requests for processing can be executed without a version number—for example, using the most recent data versions—or can be executed with respect to a computation version number. When a request for processing is with respect to a computation version number, the computation version number is provided along with a request for data to each partition storing data for the computation. Prior to accessing data on the partition, the current version number stored by the partition is accessed to ensure that the partition is updated to at least the desired version number. Since distributed databases cannot guarantee immediate updating, the check is necessary to verify the partition has seen the update for the requested version. Data is looked up on the partition according to the data key, and the stored data associated with the key associated with the requested data version is determined. For example, in the event that the stored data associated with most recent version number is determined to be less than or equal to the requested data version, the partition performs a partition reduce on the retrieved data to determine a partition result and provides the partition result back to the service node. Otherwise, the system can deterministically wait until the update has been seen or return, or provide an indication, that the update has not yet been seen and that the request should be retried later.

A system for a distributed multi-version partitioned map reduce comprises a cluster system comprising a plurality of computing nodes and one or more client application systems. A user system communicates with the cluster system via a client application system to request execution of a cluster computing task. The client application system chooses a computing node of the plurality of computing nodes and designates the chosen computing node as the service node for the task. The client application system chooses the computing node in such a way as to balance the load on the nodes of the cluster system. For example, the client application system chooses the least loaded node, the node that least recently acted as a service node, etc. The client application system then provides the designated service node with the task. The task comprises a partition map reduce step which is subdivided by the service node, one per partition, and a final service node reduce step.

The service node receives the task and provides each other node of the cluster system with a request for a partition result. For example, the service node provides the partition nodes (e.g., nodes in the cluster that store partitions, where the partitions collectively are used for the storage of data) in the cluster with the request for results and then aggregates the results into a single result which it responds with to the requestor. Note that service nodes can also store or not store data in partitions. It should be noted that the ownership of partitions by nodes is flexible and can be rearranged by the system; a given partition may, at some time, be moved to be stored on a different node, which then assumes ownership of the moved partition. The partition results are provided by the nodes to the service node. In some embodiments, the partition results are combined using a node reduce step. The node reduce step combines results of each partition stored on a node, generating a single node result associated with each node of the cluster. The node results are then provided by the nodes to the service node.

The service node receives results (e.g., partition results, node results, etc.) and combines the results using a service node reduce step to determine a service node result. The service node result comprises the result of the requested parallel clustered map reduce steps. The service node provides the service node result to the requesting system. The system for a distributed real-time partitioned map reduce improves the computing system by storing multiple versions of all partition data in addition to storing most recently updated version information on each partition such that each partition is able to give accurate information of a data value with respect to any update version number desired, enabling a map reduce operation to be executed with respect to the version number.

The service node is part of a data fabric. The data fabric comprises a software infrastructure that can manage and process large data sets in memory by virtualizing two or more physical machines' compute and memory resources into a single logical machine using the network connecting the machines. Physical machines can be added or removed dynamically to scale up or scale down the compute and storage capability of the data fabric. Additionally, the data fabric may include storage redundancy in such a way that the loss of a physical machine will not result in a loss of managed data.

FIG. 1 is a block diagram illustrating an embodiment of a network system. In some embodiments, the network system of FIG. 1 comprises a system for a distributed real-time partitioned map reduce using a data fabric. In the example shown, cluster system 104 comprises a computing system for processing cluster computing jobs. Processing cluster computing jobs comprises processing software jobs utilizing a cluster computing system (e.g., a computing system utilizing a plurality of computers operating in parallel). Cluster system 104 comprises a node pool comprising a plurality of computing nodes, wherein each node comprises data storage and data processing capacity. The computing nodes process computing tasks (e.g., reading data, writing data, processing data, etc.). Each node stores one or more partitions, each partition comprising partition data. A plurality of partitions is stored by cluster system 104. The cluster computing system additionally comprises one or more client nodes that include a client application system that a user interacts with from user system 106. User system 106, administrator system 102, cluster system 104, and write system 108 interact using network 100.

Cluster system 104 comprises a system for a distributed multi-version partitioned map reduce using a data fabric. When a cluster computing task is received by a client application system of cluster system 104 (e.g., from user system 106, administrator system 102, etc.), the client application system determines a node of a node pool and designates a service node for the task. The service node comprises a node for coordinating execution of the task and for performing a service node reduce step to determine a service node result. The client application system chooses the service node in such a way as to balance the load on the nodes. For example, the client application system chooses the least loaded node, the client application system chooses the node that was least recently chosen as a service node, the client application system chooses the service node according to a round robin ordering, etc. The client application system indicates to that node that it has been designated the service node for the task and provides the task to the service node. The service node, upon receiving the task from the client application system, begins execution and coordination of the task. The service node provides partition task logic to the plurality of partitions stored by cluster system 104 (e.g., by providing the partition task logic to the plurality of nodes each with their set of partitions). The service node additionally determines whether the task is associated with a computation version number, and, in the event the task is associated with a computation version number, the service node provides the computation version number to the plurality of partitions associated with the partition task logic.

In some cases, the partition task logic comprises a map step associated with a partition that is executed on each data element stored by the partition to create a set of values for each partition, and additionally the partition task logic comprises a reduce step that is used to combine values from the map step associated with the partition to create a partition result for each partition stored locally on the node.

When the partition receives partition task logic, it first determines whether the partition task logic is associated with a computation version number. In the event it is determined that the partition task logic is not associated with a computation version number, the partition executes the partition task logic with respect to the most recent data version currently in the system. In some embodiments, the partition task logic is always associated with a computation version number (e.g., when the current version of partition data is required the most recent version number is associated with the task and provided to the partitions). In the event it is determined that the partition task logic is associated with a computation version number, the partition first determines whether it has been updated at least to that version number. Each time an update occurs, all partitions update data storing their current version number. In the event the partition has been updated to at least the computation version number, the partition determines a set of data values for the computation associated with the computation version number. The partition then performs a partition reduce operation on the data values to determine a partition result, and provides the partition result to the service node.

Some systems for a distributed multi-versioned partitioned map reduce using a data fabric combine the partition results for each partition of a node using a node reduce to generate a node result. The partition results or the node results are provided by the nodes to the service node. The service node then executes the service node reduce to combine the results received from the nodes and determine a service node result. The service node result comprises the task result. The service node provides the service node result to the client application system, which then provides the service node result to the requesting system.

User system 106 comprises a system for requesting computations to be performed using cluster system 104. In various embodiments, network 100 provides a means for communicating between administrator system 102, cluster system 104, user system 106, and write system 108, and comprises one or more of the following: a local area network, a wide area network, a wired network, a wireless network, the Internet, an intranet, a storage area network, or any other appropriate communication network. Administrator system 102 enables an administrator to maintain cluster system 104. Administrator system 102 comprises a system for executing administrator commands, for configuring cluster system 104, for querying cluster system 104, etc. In some embodiments, user system 106 comprises a client system—for example, an object transaction server or an object read server. Write system 108 comprises a system for writing data to cluster system 104. Write system 108 stores a version number indicating the current version number. Each time write system 108 indicates to write data to cluster system 104, write system 108 increments the version number and associates the new version number with the indication to write.

Figure 2:
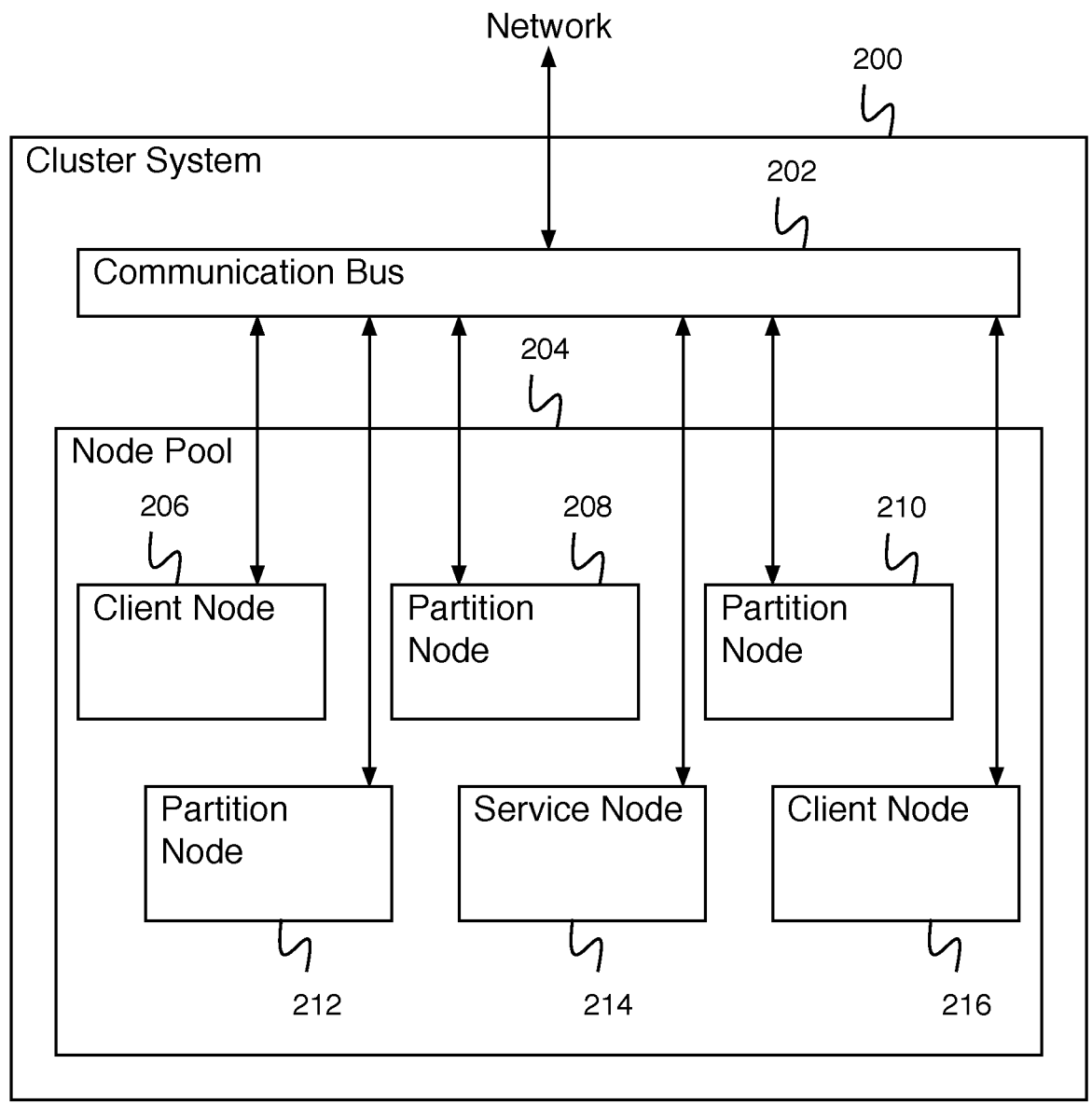
FIG. 2 is a block diagram illustrating an embodiment of a cluster system.

FIG. 2 is a block diagram illustrating an embodiment of a cluster system. In some embodiments, cluster system 200 comprises cluster system 104 of FIG. 1. In some embodiments, cluster system 200 comprises a data fabric. In the example shown, cluster system 200 comprises communication bus 202 for allowing a plurality of nodes to communicate with each other using a network. Nodes of node pool 204 include client nodes (e.g., client node 206 and client node 216), service nodes (e.g., service node 214), and partition nodes (e.g., partition node 208, partition node 210, partition node 212, etc.). Cluster system 200 comprises any appropriate number of client nodes (e.g., 1 client node, 2 client node, 5 client nodes, etc.). In some embodiments, client nodes of cluster system 200 are able to interact with any appropriate service nodes in order to balance the task processing load. Communication bus 202 also enables communication of cluster system 200 with a network enabling communication with an administrator system, user system, or other cluster system. Each of the one or more nodes comprises a computing system—for example, a computing system comprising a processor, a memory, data storage, etc. Nodes of the node pool are able to communicate with each other via communication bus 202. Nodes of the node pool can be separate computer systems, physically remote separate computer systems, separate computer systems connected via the Internet, cloud computing systems, virtual machines, virtual machines running on a single computer, etc. Node pool 204 comprises any appropriate number of nodes (e.g., 1 node, 2 nodes, 6 nodes, 12 nodes, 23 nodes, etc.). Each node stores data in a plurality of partitions. Some partitions comprise primary partitions. Some partitions comprise backup partitions—for example, copies of primary partitions, wherein a backup partition is stored on a different node than its associated primary partition. A node storing a primary partition and a node storing the associated backup partition can be physically proximate, physically remote, running as virtual machines on the same computer, or instantiated in any other appropriate way.

When cluster system 200 receives a request to perform a task, the request is initially received by communication bus 202. The requester can comprise an administrator system, a client system, a client server, an object transaction server, an object read server, etc. A client application system selects a service node—for example, a client application system associated with a user system selects a least loaded service node, a least recently chosen node, a randomly chosen node, etc.—and routes the request to the determined service node. The service node provides a request for partition results to each partition of each node of the node pool via communication bus 202. In some embodiments, the request for partition results comprises a computation version number (e.g., a version number that the computation should be performed with respect to). Each partition of each node (e.g., including the service node) then executes the partition task logic.

Executing the partition task logic comprises receiving the indication of a computation (e.g., the partition task logic), and determining whether the computation is with respect to a computation version number. In the event it is determined that the computation is with respect to a computation version number, a set of data values associated with the version number are determined, a partition reduce is executed to determine a partition result, and the partition result is provided (e.g., to the service node).

In some embodiments, the partition task logic additionally comprises a node reduce. A node executes the node reduce to combine the partition results for the partitions of a node to create a node result for a node. Results from each node (e.g., a set of partition results or a node result for each node) are provided to the service node via communication bus 202. The service node uses a service node reduce to combine the results from each node to determine a service node result. The service node result is provided via communication bus 202 to a client application system and provided via communication bus 202 to the user system.

Figure 3:
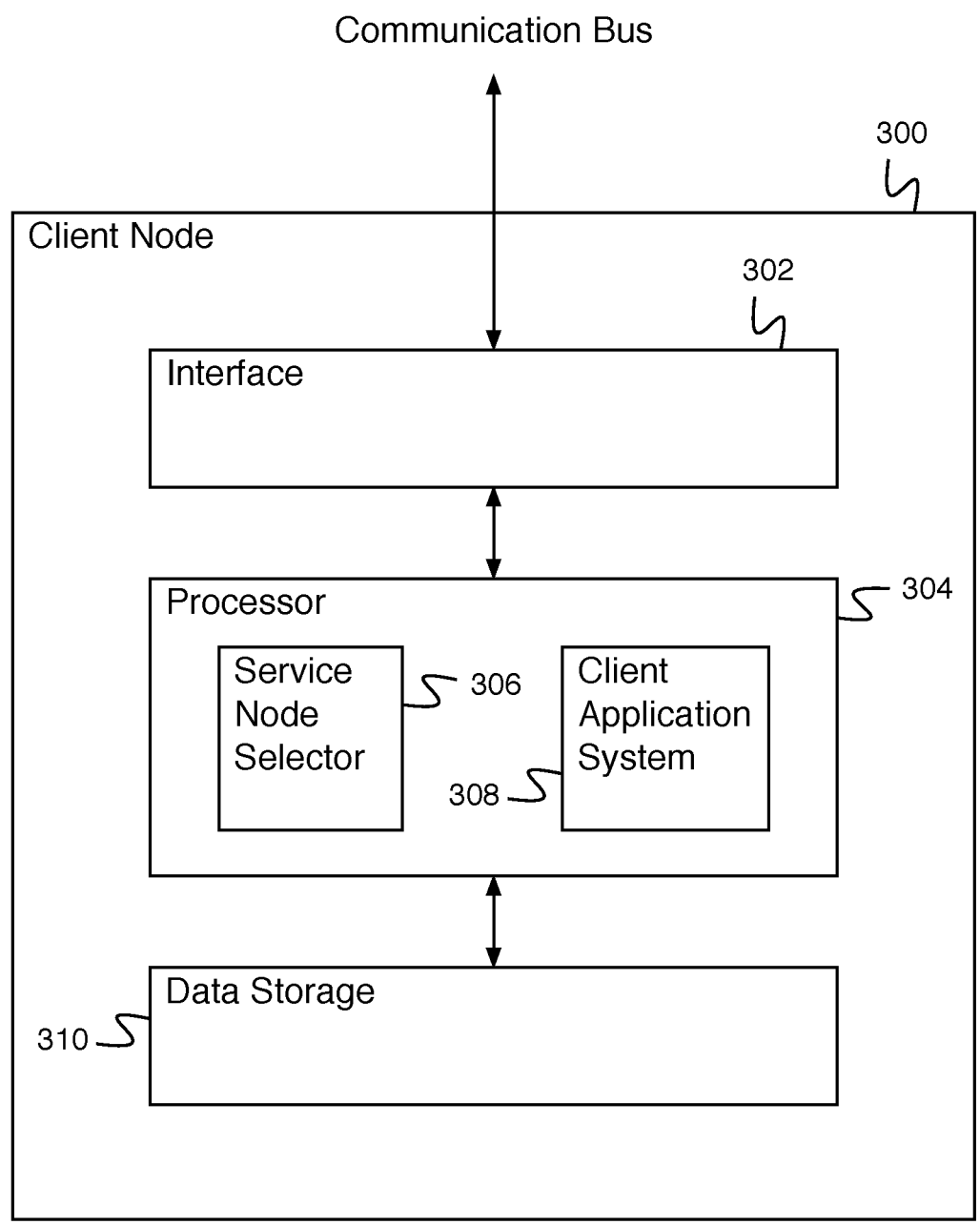
FIG. 3 is a block diagram illustrating an embodiment of a client node.

FIG. 3 is a block diagram illustrating an embodiment of a client node. In some embodiments, client node 300 comprises a client node of FIG. 2 (e.g., client node 206 or client node 216). In the example shown, client node 300 comprises interface 302 for interacting with other systems, (e.g., with a network, with a user system via the network, with a node pool, with a node of the node pool via a communication bus, etc.). Interface 302 is in communication with processor 304. Processor 304 comprises a processor for processing data. Processor 304 comprises service node selector 306 for selecting a service node (e.g., from a set of nodes of a node pool). Processor 304 includes a client application system 308 (e.g., a read system or a transaction system). Processor 304 is in communication with data storage 310 for storing data. In some embodiments, the data fabric with its partitions stores all data for the cluster system so that a local data storage (e.g., data storage 310) is not used. In some embodiments, data storage 310 comprises a temporary storage for data such as a cache or processor memory for use during processing. Service node selector 306 of processor 304 receives a request to perform a task from client application system 308. The service node selector 306 selects a service node to process a task (e.g., a least loaded node, a next node in a round robin manner, etc.), and provides the task to the selected service node. After the task is executed as managed by the service node, client node 300 receives the results and provides them to the user.

Figure 4:
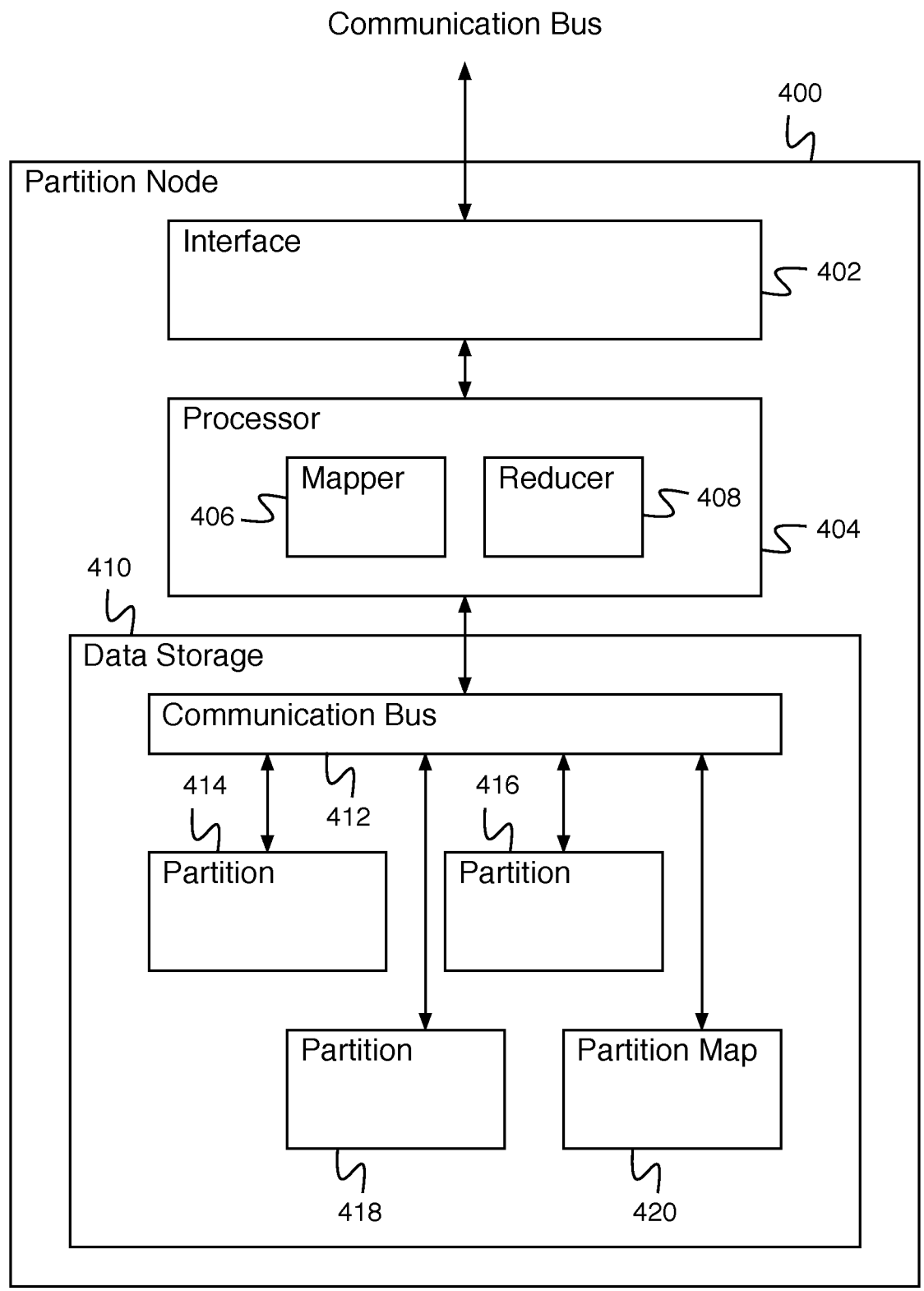
FIG. 4 is a block diagram illustrating an embodiment of a partition node.

FIG. 4 is a block diagram illustrating an embodiment of a partition node. In some embodiments, partition node 400 comprises a partition node of node pool 204 of FIG. 2 (e.g., partition node 208, partition node 210, and partition node 212). In the example shown, partition node 400 comprises interface 402 for interacting with other systems (e.g., with a client application system). Interface 402 is in communication with processor 404. Processor 404 comprises a processor for processing data. In the example shown, processor 404 comprises mapper 406 for executing a map operation. For example, mapper 406 comprises a mapper for executing a partition map operation on each data element stored by a partition (e.g., a partition stored by data storage 410) to create a set of partition map values for the partition. Processor 404 additionally comprises reducer 408 for executing a reduce operation. For example, reducer 408 executes a partition reduce step to combine partition map values to create a partition result for a partition. In some embodiments, reducer 408 executes a node reduce step to combine partition results to create a node result for a node. Partition results and/or node results are provided by processor 404 to a service node via interface 402. Processor 404 is in communication with data storage 410. Data storage 410 comprises communication bus 412 for allowing partition 414, partition 416, partition 418, partition map 420 to communicate with processor 404. Partition 414, partition 416, and partition 418 comprise partitions for storing partition data. In some embodiments, partition 414, partition 416, and partition 418 comprise part of a data fabric. Partition map 420 comprises a partition map for storing partition metadata. Partition metadata comprises primary partition identifiers, backup partition identifiers, indications of partition lock status (e.g., read locked, write locked), etc. Partition map 420 acts as a gatekeeper for interactions with data stored on the partitions of a node and, in particular, mediates different requests for accessing the data including reading access, writing access, editing access, or deleting access and whether those requests are allowed or not allowed based on what access is currently occurring for the data.

In the example shown, for processing, partition node 400 receives partition process instructions via interface 402 for partitions that are used to execute operations for elements of each partition (e.g., partition 414, partition 416, and partition 418) of partition node 400. Mapper 406 of processor 404 distributes map instructions to each partition and results are provided to reducer 408. The results are reduced at the partition level or further reduced at the node level. The reduced results are provided to the service node. Access to the partitions is coordinated by partition map 420. For example, partition map 420 is used to negotiate access to data stored in a partition. Specifically, one example of access control by partition map 420 is when reading access is delayed to data in a given partition by partition map 420 until an existing write for that specific data in the given partition has been completed.

Figure 5:
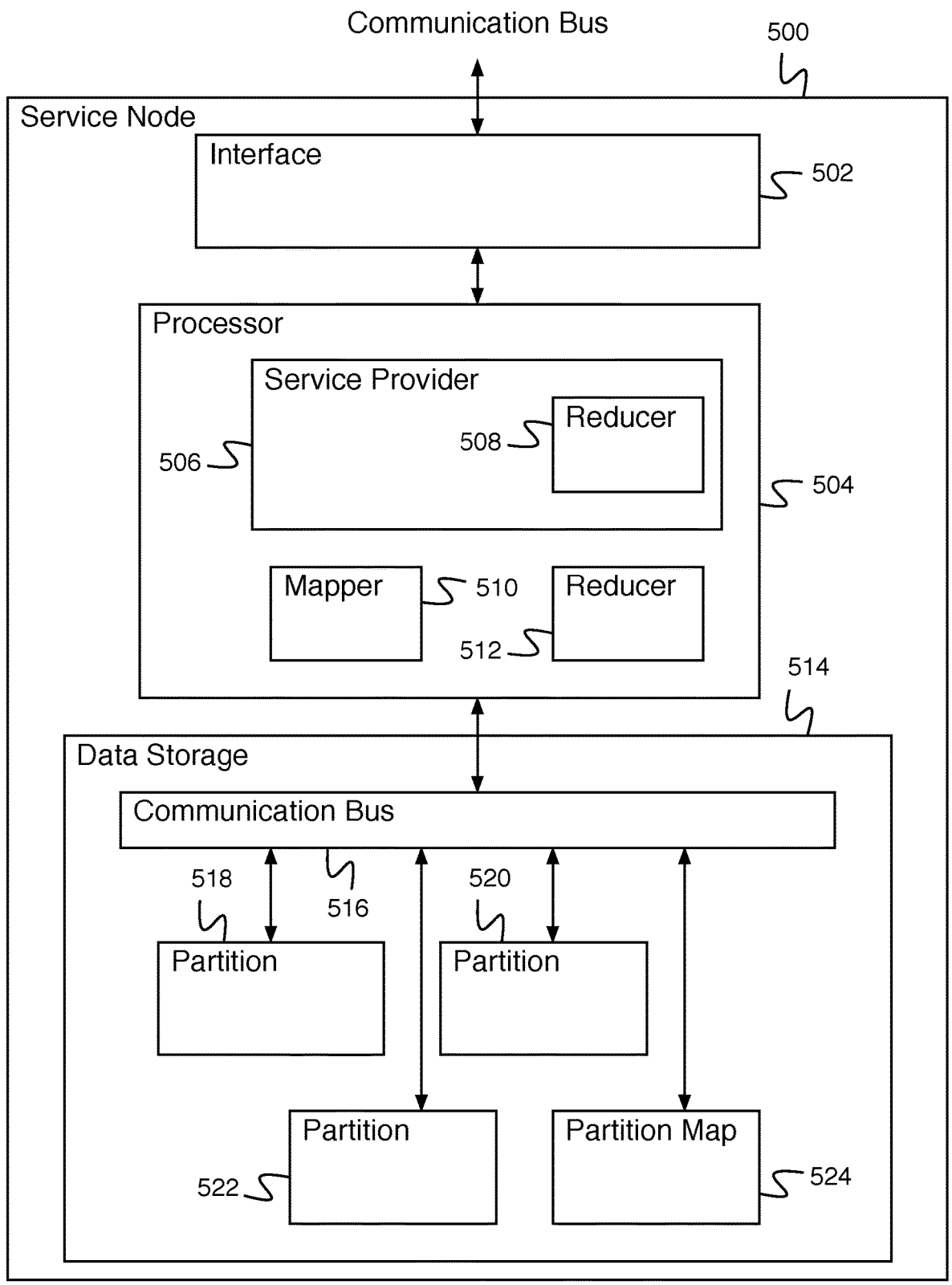
FIG. 5 is a block diagram illustrating an embodiment of a service node.

FIG. 5 is a block diagram illustrating an embodiment of a service node. In some embodiments, service node 500 comprises a node of node pool 204 of FIG. 2 (e.g., service node 214). In the example shown, service node 500 is selected as a service node by a client application system to perform a task and receives task via interface 502. Mapper 510 of processor 504 causes execution of a map partition process for each data stored in the partitions (e.g., partition 518, partition 520, partition 522, as well as partitions on other nodes). Reducer 512 of processor 504 causes execution of a reduce partition process to create a result. Reducer 508 of service provider 506 causes execution of a reduce of results from the partition processes of the partitions or nodes. The result of service provider 506 reduce is provided via interface 502 to the client application system, which in turn provides the result to the requestor of the task.

In the example shown, service node 500 comprises interface 502 for interacting with other systems (e.g., with a client application system). Interface 502 is in communication with processor 504. Processor 504 comprises a processor for processing data. Processor 504 comprises service provider 506 for coordinating a task. Service provider 506 comprises reducer 508 for performing a service node reduce. A service node reduce combines partition results and/or node results to determine a service node result. The service node result is provided by processor 504 via interface 502 to a client application system. In some embodiments, the service node result is stored by predetermined service node results. Processor 504 additionally comprises mapper 510 for executing a map operation. For example, mapper 510 comprises a mapper for executing a partition map operation on each data element stored by a partition (e.g., a partition stored by data storage 514) to create a set of partition map values for the partition. Processor 504 additionally comprises reducer 512 for executing a reduce operation. For example, reducer 512 executes a partition reduce step to combine partition map values to create a partition result for a partition. In some embodiments, reducer 512 executes a node reduce step to combine partition results to create a node result for a node. Partition results and/or node results are provided to service provider 506. Processor 504 is in communication with data storage 514. Data storage 514 comprises communication bus 516 for allowing partition 518, partition 520, partition 522, or partition map 524 to communicate with processor 504. Partition 518, partition 520, and partition 522 comprise partitions for storing partition data. In some embodiments, partition 518, partition 520, and partition 522 comprise part of a data fabric. Partition map 524 comprises a partition map for storing partition metadata. Partition metadata comprises primary partition identifiers, backup partition identifiers, indications of partition lock status (e.g., read locked, write locked), etc. Partition map 524 acts as a gatekeeper for interactions with data stored on the partitions of a node and, in particular, mediates different requests for accessing the data including reading access, writing access, editing access, or deleting access and whether those requests are allowed or not allowed based on what access is currently occurring for the data.

Figure 6:
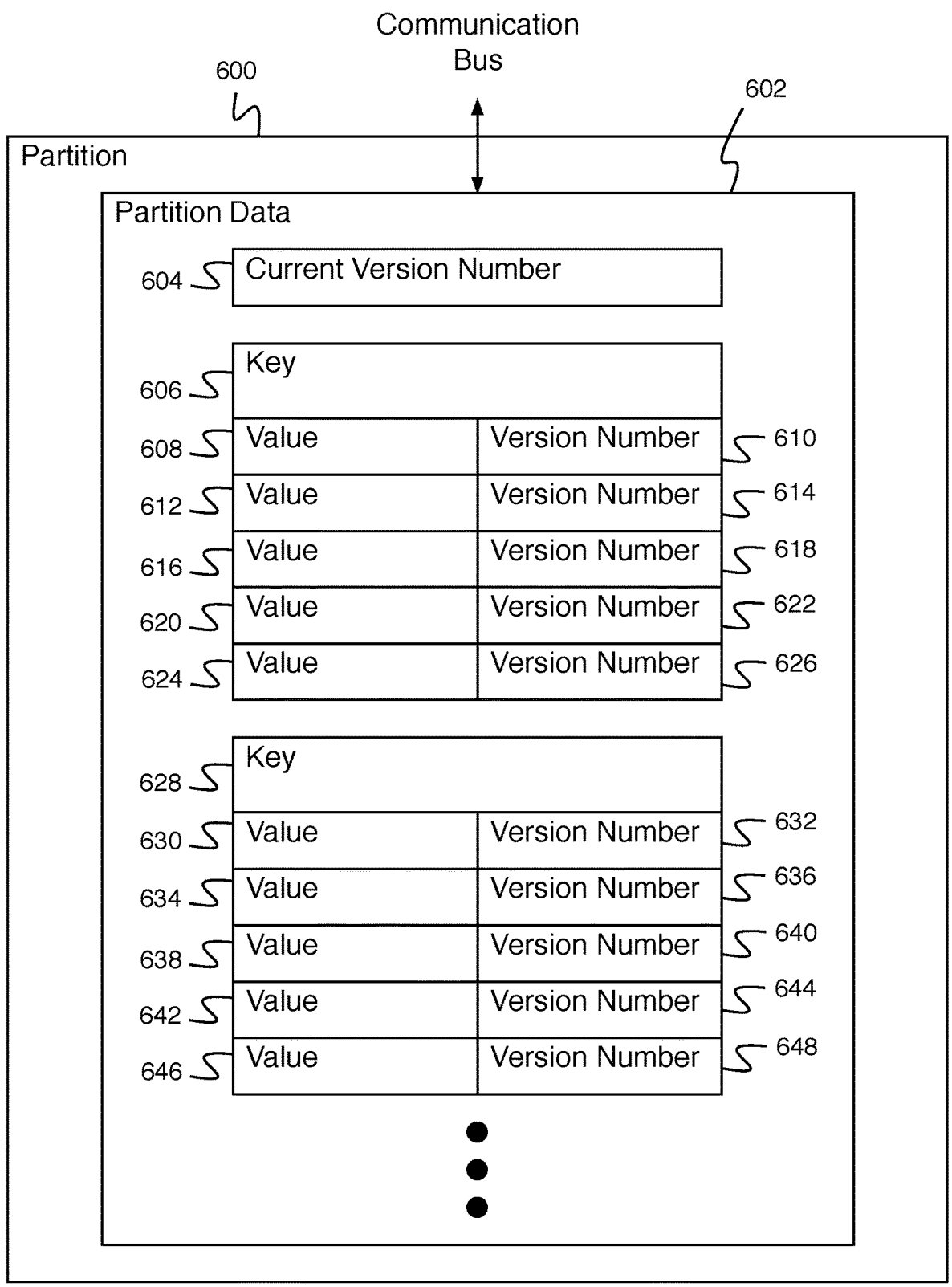
FIG. 6 is a block diagram illustrating an embodiment of a partition.

FIG. 6 is a block diagram illustrating an embodiment of a partition. In some embodiments, partition 600 comprises a partition of FIG. 4 or a partition of FIG. 5. In the example shown, partition 600 stores data in partition data 602. Data is processed using partition processing instructions (e.g., a map instruction or a reduce instruction) and the results are provided using the communications bus and stored in predetermined partition results. Partition data 602 comprises a segment of stored cluster data (e.g., data stored on a cluster system—for example, cluster system 104 of FIG. 1). In various embodiments, partition data comprises raw data, table rows, key-value pairs, or any other appropriate data type. In some embodiments, partition data comprises a set of related data instances—for example, data describing a set of bank accounts, data describing a set of user preferences, data describing a set of transactions, data describing a set of user actions, etc. Partition data 602 stores current version number 604 indicating the current version number of the partition. Each time an update indication including a new version number is received by partition 600, the new version number is stored as current version number 604. Partition data 602 additionally stores a set of data indexed using keys. Key 606 comprises a key for retrieving an associated data value. Key 606 is associated with value 608, value 612, value 616, value 620, and value 624. Each value is associated with a version number. Value 606 is associated with version number 610, value 612 is associated with version number 614, value 616 is associated with version number 618, value 620 is associated with version number 622, and value 624 is associated with version number 626. Values are stored in a data structure from least to most recent (e.g., version number 610 is more recent than version number 614, version number 614 is more recent that version number 618, etc.). Not every version number is represented by the version numbers associated with the values associated with key 606 (e.g., in the event a version update occurs and the value associated with key 606 is not updated, a new value and version number are not stored; however, a new value for current version number 604 is stored). In the event partition 600 receives a request for the most recent value associated with key 606, value 608 is provided. In the event partition 600 receives a request for a value associated with key 606 associated with a computation version number, the value associated with key 606 associated with the most recent version number older than or equal to the computation version number is determined.

Key 628 comprises a key for retrieving an associated data value. Key 628 is associated with value 630, value 634, value 638, value 642, and value 646. Each value is associated with a version number. Value 630 is associated with version number 632, value 634 is associated with version number 636, value 638 is associated with version number 640, value 642 is associated with version number 644, and value 646 is associated with version number 648. Any appropriate number of keys, each with any appropriate number of associated values is stored by partition data 602.

Figure 7:
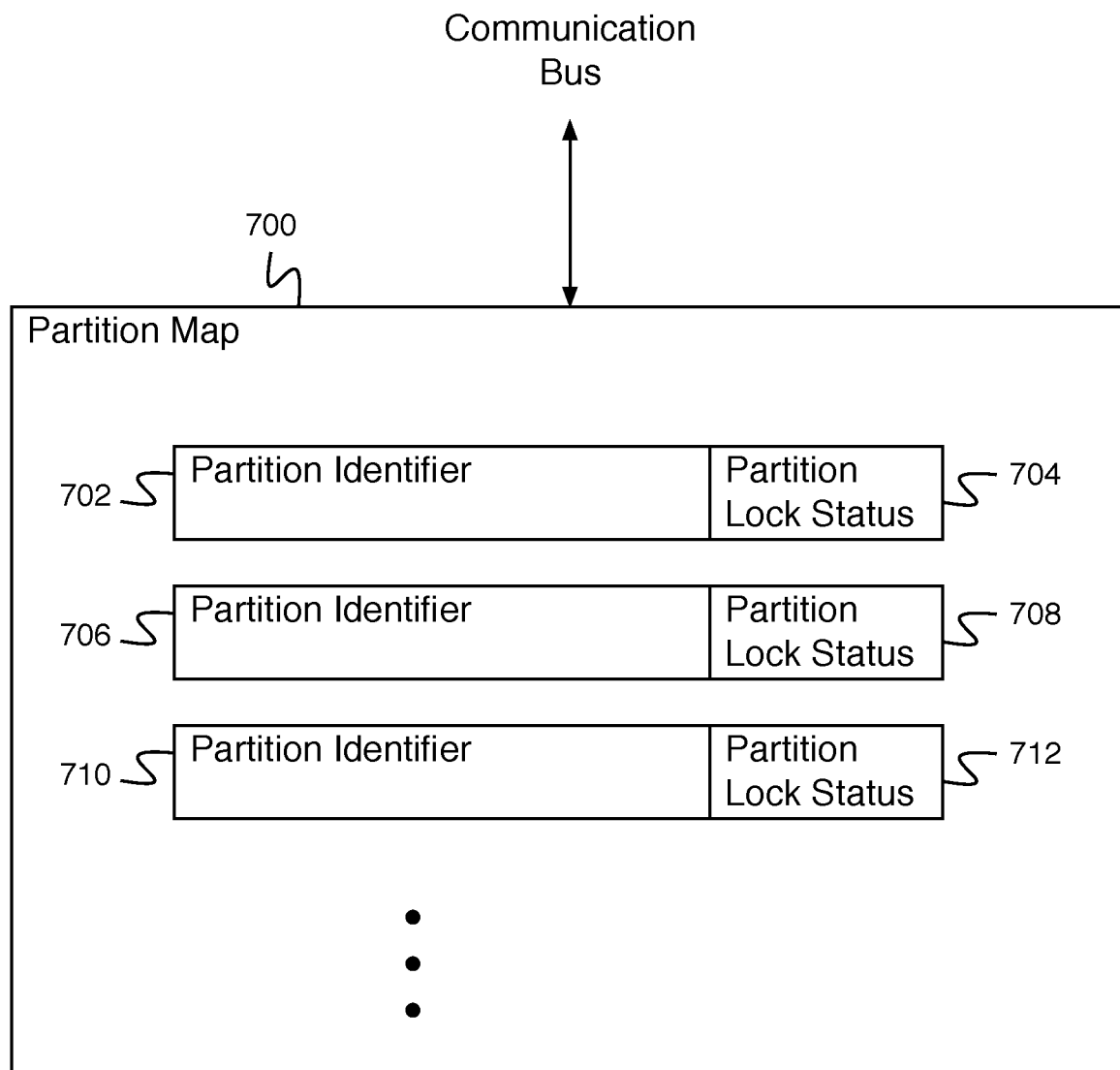
FIG. 7 is a block diagram illustrating an embodiment of a partition map.

FIG. 7 is a block diagram illustrating an embodiment of a partition map. In some embodiments, partition map 700 comprises partition map 420 of FIG. 4 or partition map 524 of FIG. 5. In the example shown, a node receives partition process instructions and causes execution of the instructions to process data in a partition. The partition is processed after locking the data appropriately (e.g., read lock, write lock, etc.) and then after processing unlocking the partition. Partition map 700 comprises a set of partition identifiers and associated partition lock statuses (e.g., partition identifier 702 and associated partition lock status 704, partition identifier 706 and associated partition lock status 708, and partition identifier 710 and associated partition lock status 712). Each partition identifier stored by partition map 700 is associated with a partition stored by the same node as partition map 700. Partition map 700 is used to identify the partitions that are stored by the node. Partition map 700 is additionally used to store a lock status associated with each partition of the node as well as any additional computed values about the contents of the partition data. The lock status comprises a status indicating whether the partition is locked, for example, read locked or write locked. In some embodiments, a partition is locked during a partition map operation.

Figure 8:
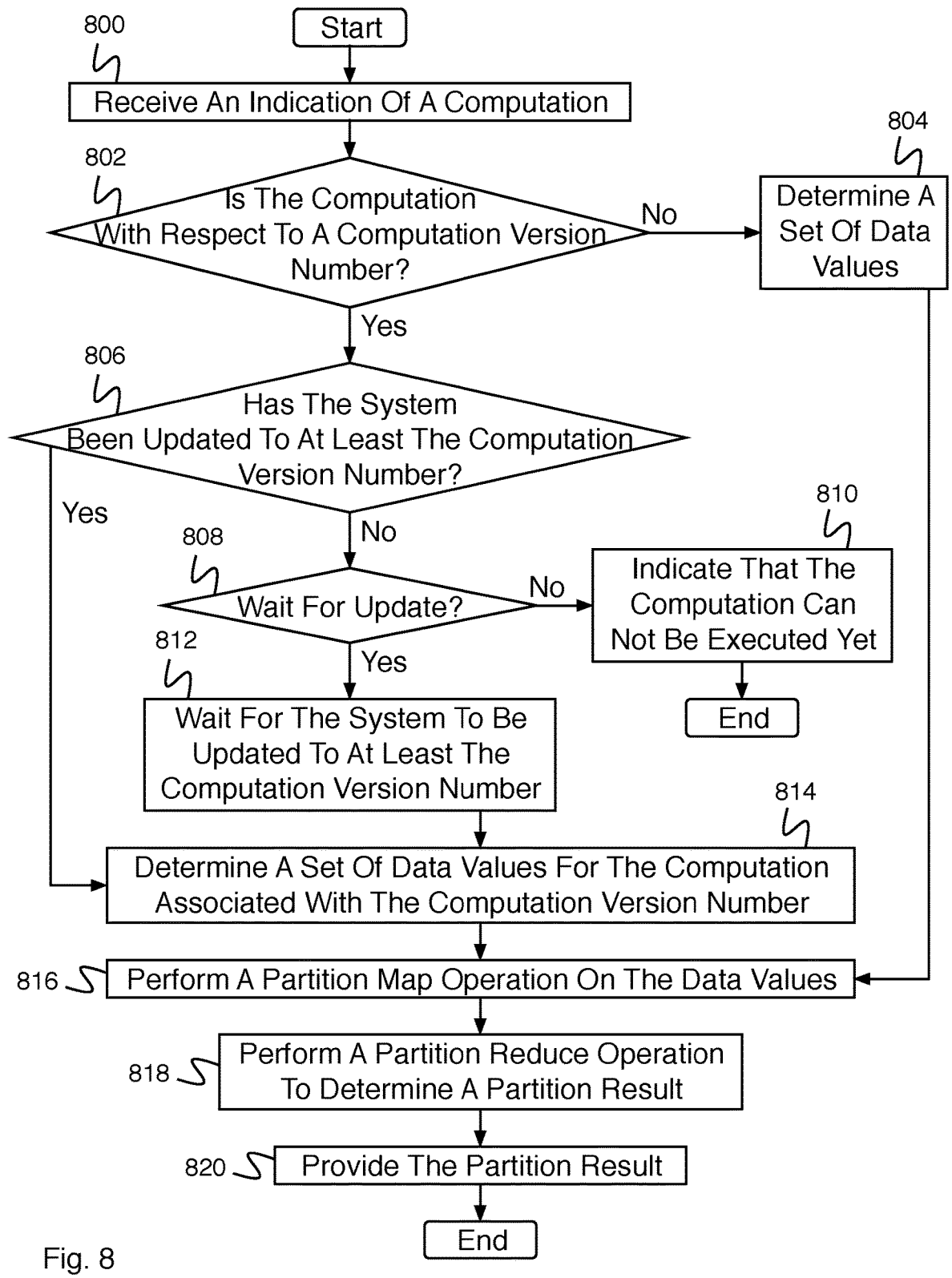
FIG. 8 is a block diagram illustrating an embodiment of a process for a partition.

FIG. 8 is a block diagram illustrating an embodiment of a process for a partition. In some embodiments, the process of FIG. 8 is executed by partition 600 of FIG. 6. In some embodiments, the process of FIG. 8 is executed by a partition node storing data on a partition (e.g., partition node 400 of FIG. 4). In the example shown, in 800, an indication of a computation is received. In 802, it is determined whether the computation is with respect to a computation version number. For example, it is determined whether there is an associated version number of the computation or of the transaction associated with the computation. In some embodiments, in the event that a computation has no version number associated with it, a version number is assigned to the computation and control passes to 806. In the event it is determined that the computation is not with respect to a computation version number, control passes to 804. In 804, a set of data values is determined. Control then passes to 816. In the event it is determined in 802 that the computation is with respect to a computation version number, control passes to 806. In 806, it is determined whether the system (e.g., the partition) has been updated to at least the computation version number. In the event it is determined that the system has been updated to at least the computation version number, control passes to 814. In the event it is determined that the system has not been updated to at least the computation version number, control passes to 808. In 808 it is determined whether to wait for updates. For example, an indication is provided as part of the indication of the computation to wait for updates, it is determined whether to wait for updates based at least in part on a user preferences, it is determined whether to wait for updates based at least in part on a calling process priority, etc. In the event it is determined not to wait for an update, control passes to 810. In 810, the process indicates that the computation can not be executed yet, and the process ends. In the event it is determined in 808 to wait for updates, control passes to 812. In 812, the process waits for the system to be updated to at least the computation version number. In 814, a set of data values for the computation are determined associated with the computation version number. In 816, a partition map operation is performed on the data values. For example, a partition map comprises a processing step applied to each value. In 818, a partition reduce operation is performed to determine a partition result. In 820, the partition result is provided.

Figure 9:
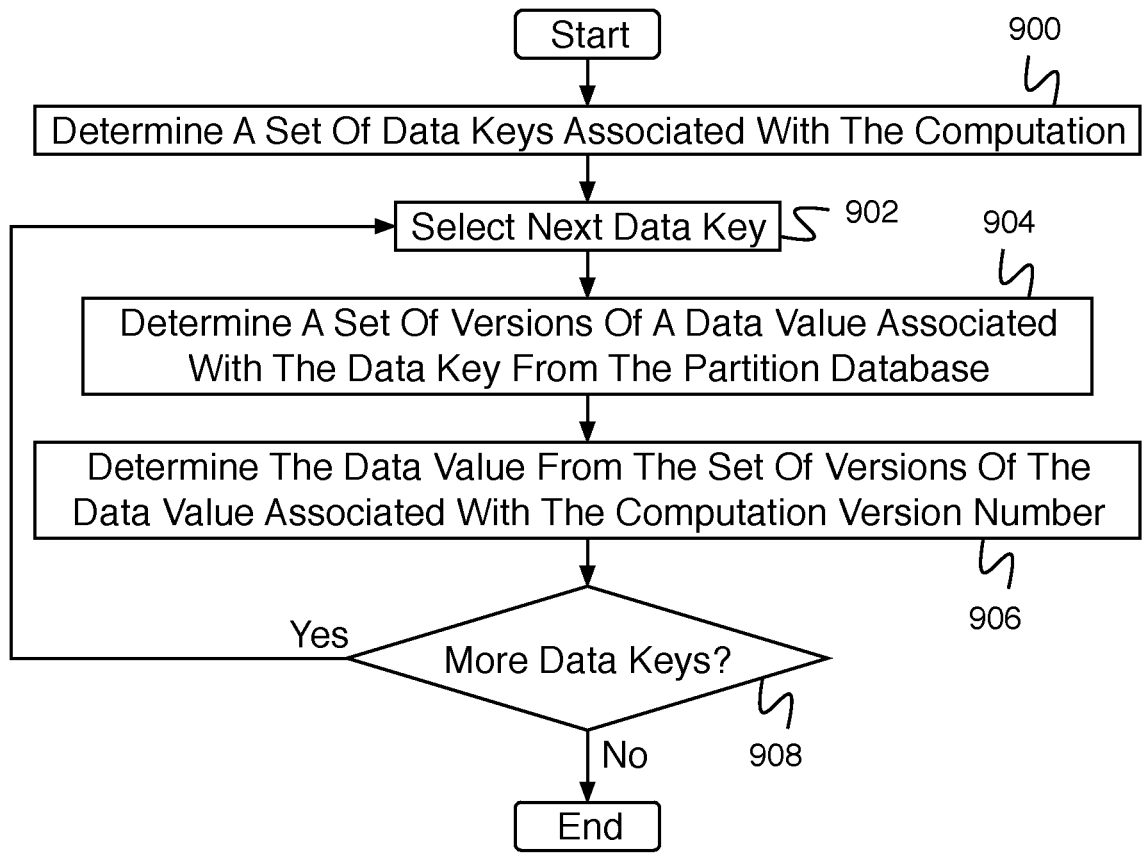
FIG. 9 is a flow diagram illustrating an embodiment of a process for determining a set of data values for a computation associated with a computation version number.

FIG. 9 is a flow diagram illustrating an embodiment of a process for determining a set of data values for a computation associated with a computation version number. In some embodiments, the process of FIG. 9 implements 814 of FIG. 8. In the example shown, in 900, a set of data keys associated with the computation is determined. The set of data keys comprise a set of data keys for which data values are to be retrieved. In 902, a next data key is selected. In some embodiments, the next data key comprises the first data key. In 904, a set of versions of a data value associated with the data are determined from the partition database. In 906, the data value associated with the computation version number is determined from the set of versions of the data value. In some embodiments, the data value comprises the most recent data value with a version number older than or equal to the computation version number. In 908, it is determined whether there are more keys (e.g., more key with data values to be retrieved). In the event it is determined that there are more keys, control passes to 902. In the event it is determined that there are not more keys, the process ends.

Figure 10:
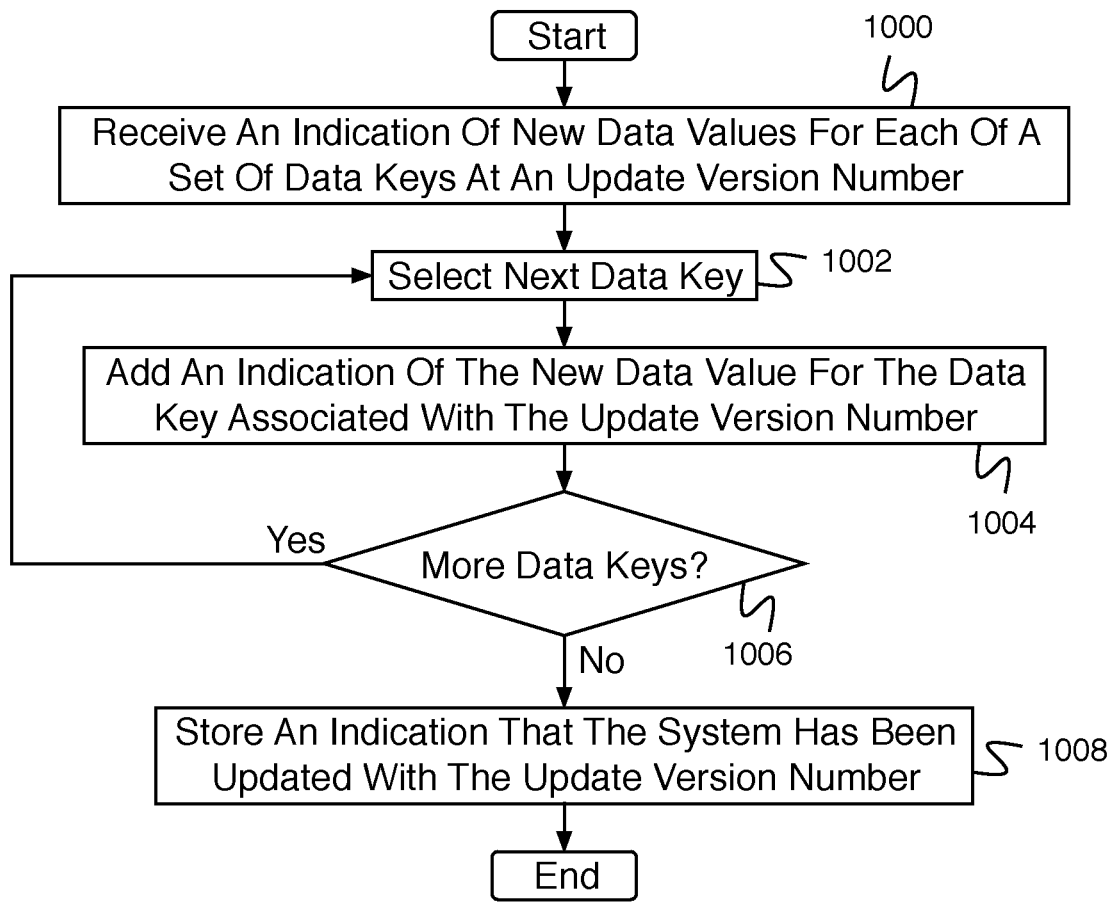
FIG. 10 is a flow diagram illustrating an embodiment of a process for updating data on a partition.

FIG. 10 is a flow diagram illustrating an embodiment of a process for updating data on a partition. In some embodiments, the process of FIG. 8 is executed by partition 600 of FIG. 6. In some embodiments, the process of FIG. 8 is executed by a partition node storing data on a partition (e.g., partition node 400 of FIG. 4). In the example shown, in 1000, an indication is received of new data values for each of a set of data keys at an update version number. In 1002, a next data key is selected. In some embodiments, the next data key comprises the first data key. In 1004, an indication of the new data value for the data is added (e.g., to the partition data) associated with the update version number. In 1006, it is determined whether there are more data keys. In the event it is determined that there are more data keys, control passes to 1002. In the event it is determined that there are not more data keys, control passes to 1008. In 1008, an indication that the system has been updated with the update version number is stored.

Figure 11:
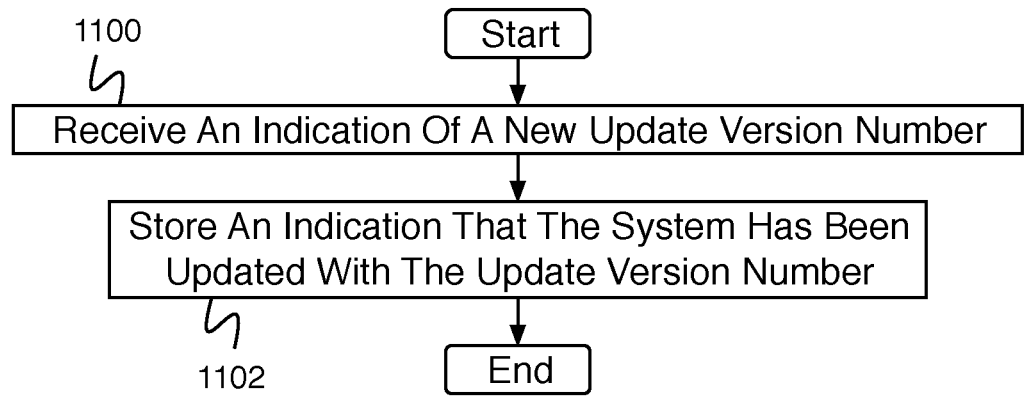
FIG. 11 is a flow diagram illustrating an embodiment of a process for updating a version number on a partition.

FIG. 11 is a flow diagram illustrating an embodiment of a process for updating a version number on a partition. In some embodiments, the process of FIG. 8 is executed by partition 600 of FIG. 6. In some embodiments, the process of FIG. 8 is executed by a partition node storing data on a partition (e.g., partition node 400 of FIG. 4). In the example shown, in 1100, an indication of a new update version number is received. In 1102 an indication is stored that the system has been updated with the update version number.

Figure 12:
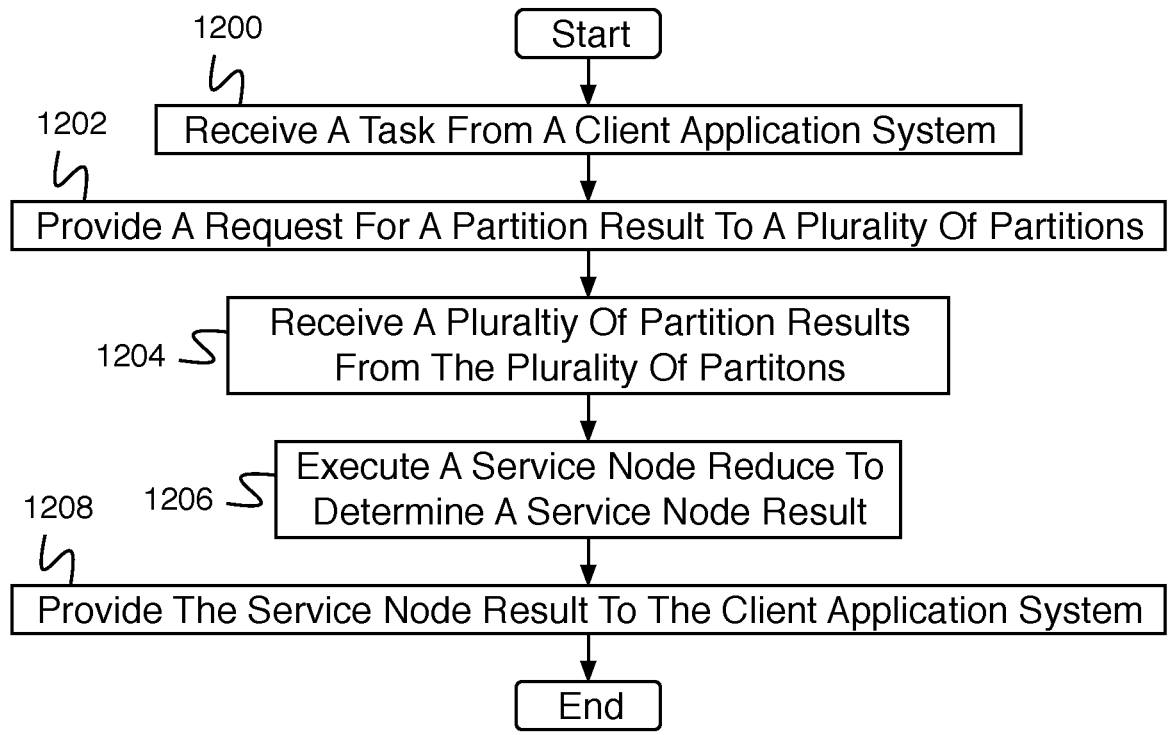
FIG. 12 is a flow diagram illustrating an embodiment of a process for a service node.

FIG. 12 is a flow diagram illustrating an embodiment of a process for a service node. In some embodiments, the process of FIG. 12 is executed by service node 500 of FIG. 5. In the example shown, in 1200, a task is received from a client application system. In some embodiments, the task comprises a version number. In 1202, a request for a partition result is provided to a plurality of partitions. For example, in the event the task received from the client application system comprises a version number, the version number is included in the request for the partition result. In 1204, a plurality of partition results is received from the plurality of partitions. In 1206, a service node reduce is executed to determine a service node result. In 1208, the service node result is provided.

Figure 13:
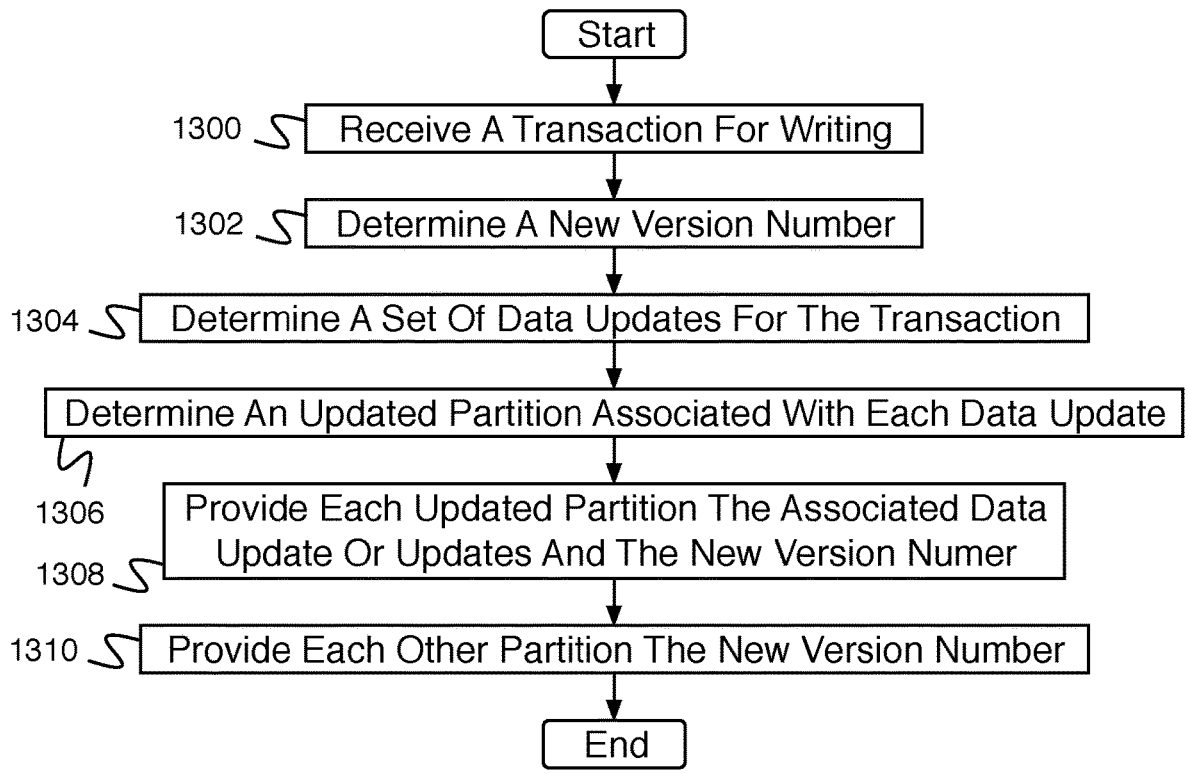
FIG. 13 is a flow diagram illustrating an embodiment of a process for writing data.

FIG. 13 is a flow diagram illustrating an embodiment of a process for writing data. In some embodiments, the process of FIG. 13 is executed by write system 108 of FIG. 1. In the example shown, in 1300, a transaction for writing is received. In some embodiments, a write lock is executed, for example, locking the state of the cluster system to other processes during the write. In 1302, a new version number is determined. In some embodiments, determining a new version number comprises incrementing a previous version number. In 1304, a set of data updates for the transaction is determined. For example, the set of data updates for the transaction comprise a set of data updates intended by the transaction to happen simultaneously. In 1306, an updated partition associated with each data update is determined. For example, the updated partition associated with the data update comprises the partition storing the data value for the data key of the update. In some embodiments, one or more updated partitions associated with each data update are determined. For example, the set of updated partitions comprises primary partitions and backup partitions. In 1308, each updated partition is provided the associated data update or updates and the new version number. In 1310, each other partition is provided the new version number.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing a computation, comprising:
   an interface configured to receive an indication of the computation;
   a plurality of partitions; and
   a processor configured to:
      determine whether the computation is with respect to a computation version number;
      in response to a determination that the computation is with respect to a computation version number:
         determine whether a current partition version number stored by a partition of the plurality of partitions is at least as current as the computation version number;
         in response to a determination that the current partition version number stored by the partition of the plurality of partitions is at least as current as the computation version number:
            determine a set of data values for the computation associated with the computation version number;
            perform a partition reduce operation on the set of data values to determine a partition result; and
            provide the partition result.

2. The system of claim 1, wherein the processor is further configured to:
  in response to a determination that the computation is not with respect to a computation version number:
    determine a set of data values;
    perform a partition reduce operation on the set of data values to determine a partition result; and
    provide the partition result.

3. The system of claim 1, wherein the processor is further configured to:
  in response to a determination that the current partition version number stored by the partition of the plurality of partitions is not at least as current as the computation version number:
    provide an indication that the computation can not be executed yet.

4. The system of claim 1, wherein the processor is further configured to:
  in response to a determination that the current partition version number stored by the partition of the plurality of partitions is not at least as current as the computation version number:
    wait for the system to be updated to at least the computation version number;
    determine a set of data values for the computation associated with the computation version number;
    perform a partition reduce operation on the set of data values to determine a partition result; and
    provide the partition result.

5. The system of claim 1, wherein the processor is additionally configured to perform a partition map operation on each of the set of data values.

6. The system of claim 1, wherein determining a set of data values for the computation associated with the computation version number comprises:
  determining a set of data keys associated with the computation;
  for each data key of the set of data keys:
    determining a set of versions of a data value associated with the data key from a partition database; and
    determining the data value from the set of versions of the data value associated with the computation version number.

7. The system of claim 6, wherein determining the data value from the set of versions of the data value associated with the computation version number comprises determining the data value from the set of versions of the data value associated with the most recent version number less than or equal to the computation version number.

8. The system of claim 1, wherein the interface is further configured to receive an new data indication of new data values for each of a set of data keys at an update version number; and
  the processor is further configured to:
    store an updated version indication that the system has been updated to the update version number;
    for each key of the set of data keys:
      add a new data value indication of the new data value for the data key associated with the update version number.

9. The system of claim 1, wherein the interface is further configured to receive a new update version number indication of a new update version number; and
  the processor is further configured to store a system update indication that the system has been updated to the update version number.

10. The system of claim 1, wherein the indication of the computation is received from a service node, and the partition result is provided to a service node.

11. The system of claim 10, wherein the service node is further configured to perform a service node reduce on one or more partition results to determine a service node result.

12. The system of claim 1, wherein the plurality of partitions comprises a portion of a data fabric.

13. The system of claim 1, wherein the partition of the plurality of partitions comprises the set of data values.

14. A method for performing a computation, comprising:
  receiving an indication of the computation;
  determining, using a processor, whether a current partition version number stored by a partition of a plurality of partitions is at least as current as the computation version number; and
  in response to a determination that the current partition version number stored by the partition of the plurality of partitions is at least as current as the computation version number:
    determining whether the system has been updated to at least the computation version number;
    in response to a determination that the system has been updated to at least the computation version number:
      determining a set of data values for the computation associated with the computation version number;
      performing a partition reduce operation on the set of data values to determine a partition result; and
      providing the partition result.

15. A computer program product for performing a computation, the computer program product being embodied in a non-transitory computer readable storage medium and comprising computer instructions for:
  receiving an indication of the computation;
  determining whether the computation is with respect to a computation version number;
  in response to a determination that the computation is with respect to a computation version number:
    determining whether a current partition version number stored by a partition of a plurality of partitions is at least as current as the computation version number; and
    in response to a determination that the system has been updated to at least the computation version number:
      current partition version number stored by the partition of the plurality of partitions is at least as current as the computation version number:
        determining a set of data values for the computation associated with the computation version number;
        performing a partition reduce operation on the set of data values to determine a partition result; and
        providing the partition result.

16. A system for updating data, comprising:
  an interface configured to receive a transaction for writing data;
  a plurality of partitions comprising partition data; and
  a processor configured to:
    determine a new version number for the transaction;
    determine a set of data updates for the transaction, wherein the set of data updates comprises new data values for each of a set of data keys;
    determine an updated partition of the plurality of partitions associated with each data update;
    provide each updated partition the associated data update or updates and the new version number, wherein each updated partition updates associated partition data based at least in part on the associated data update or updates and updates an associated current partition version number to the new version number;

provide each other partition of the plurality of partitions the new version number, wherein each other partition updates the associated current partition version number to the new version number.

17. The system of claim 16, wherein determining the new version number comprises incrementing a previous version number.

18. The system of claim 16, wherein the updated partition associated with the data update comprises a partition storing the data value for a data key of an update.

19. The system of claim 16, wherein the updated partitions of the plurality of partitions comprise primary partitions and backup partitions.

20. The system of claim 16, wherein the processor is further configured to execute a write lock.

21. The system of claim 16, wherein the set of data updates for the transaction comprises a set of data updates indicated by the transaction to happen simultaneously.

* * * * *